Nov. 25, 1941.   J. J. NEUMAN   2,264,247
AUTOMATIC CONTROL OF CENTRIFUGAL EXTRACTORS
Filed April 9, 1937   7 Sheets-Sheet 1

Inventor
JACOB J. NEUMAN
By C. P. Goepel
Attorney

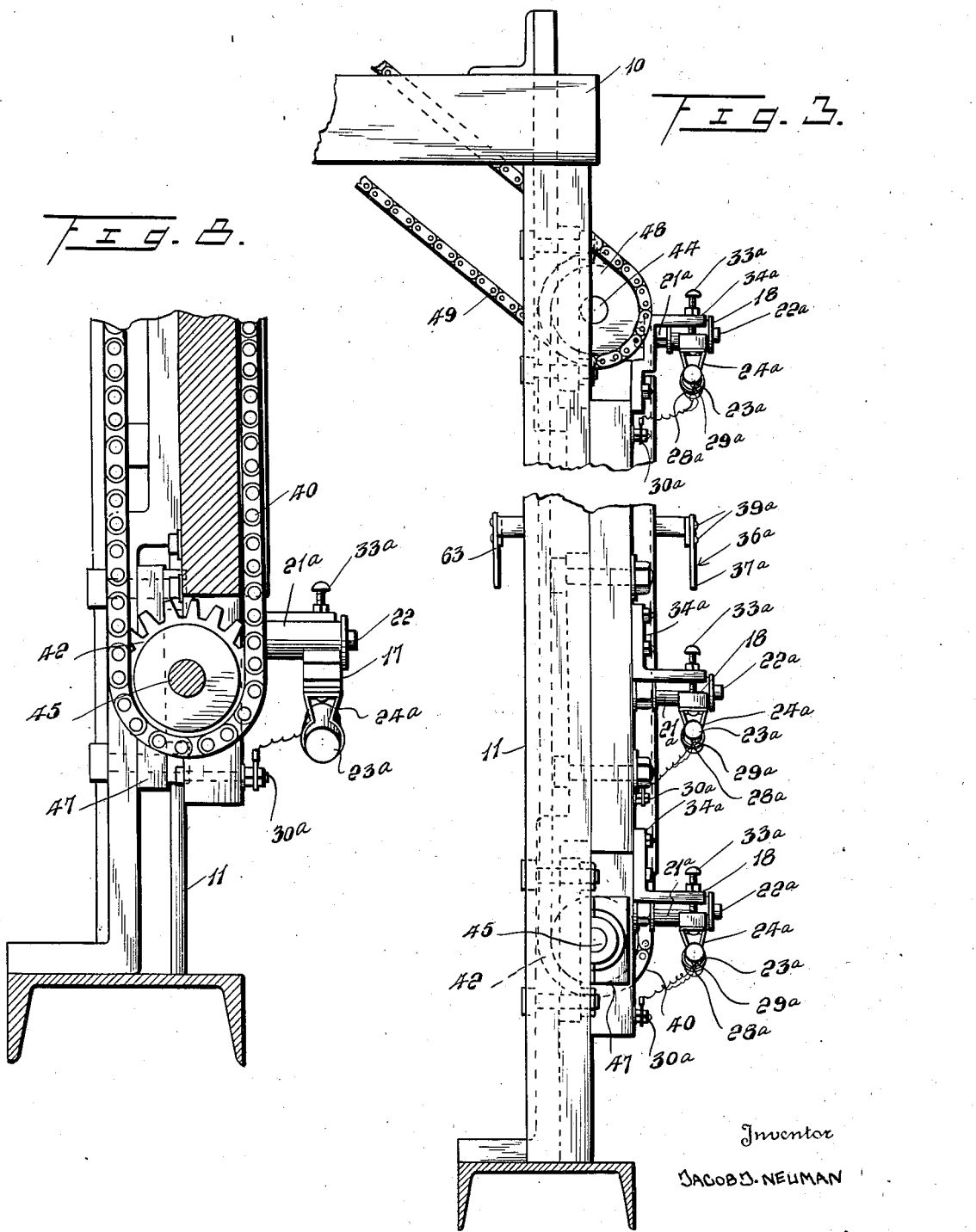

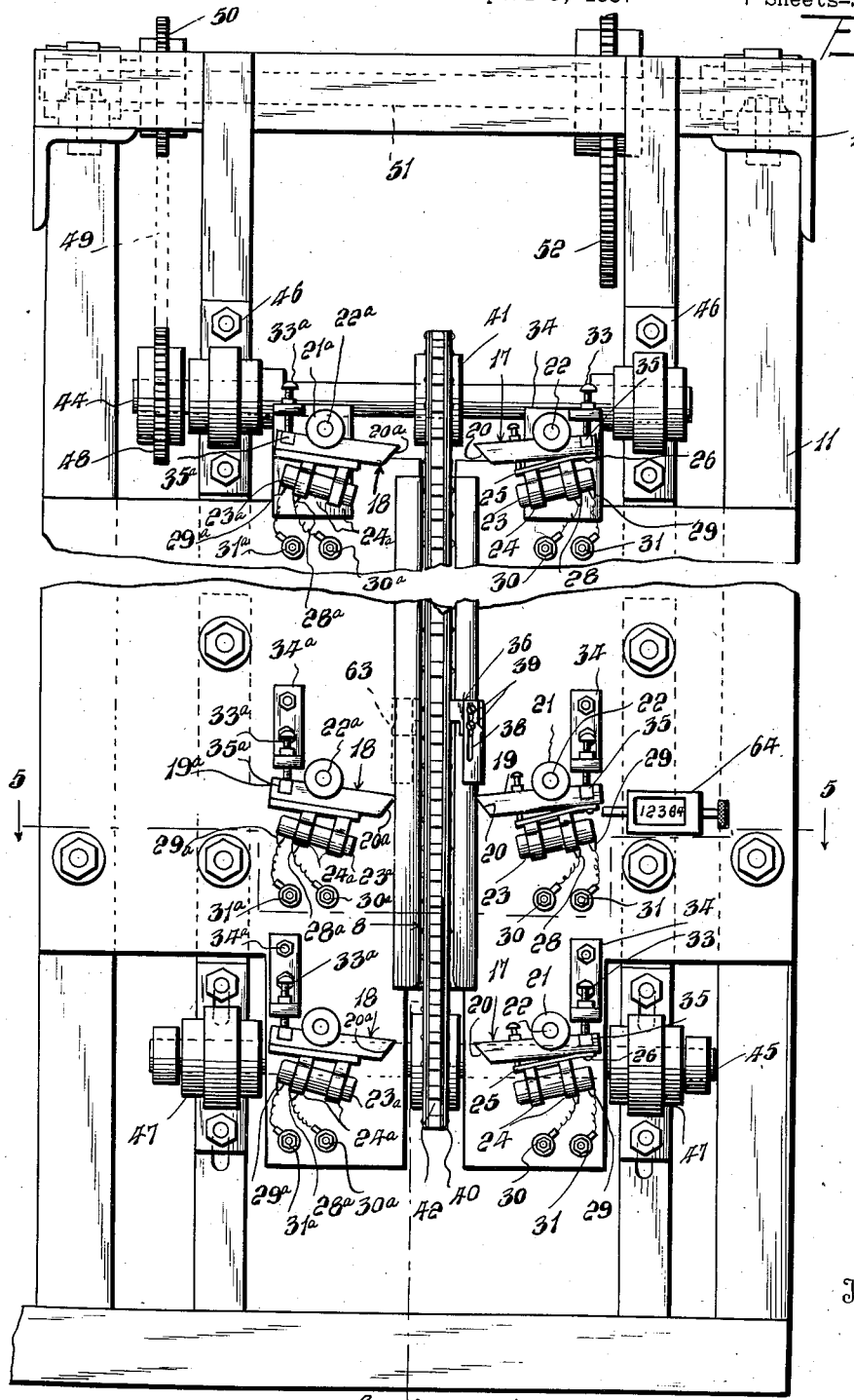

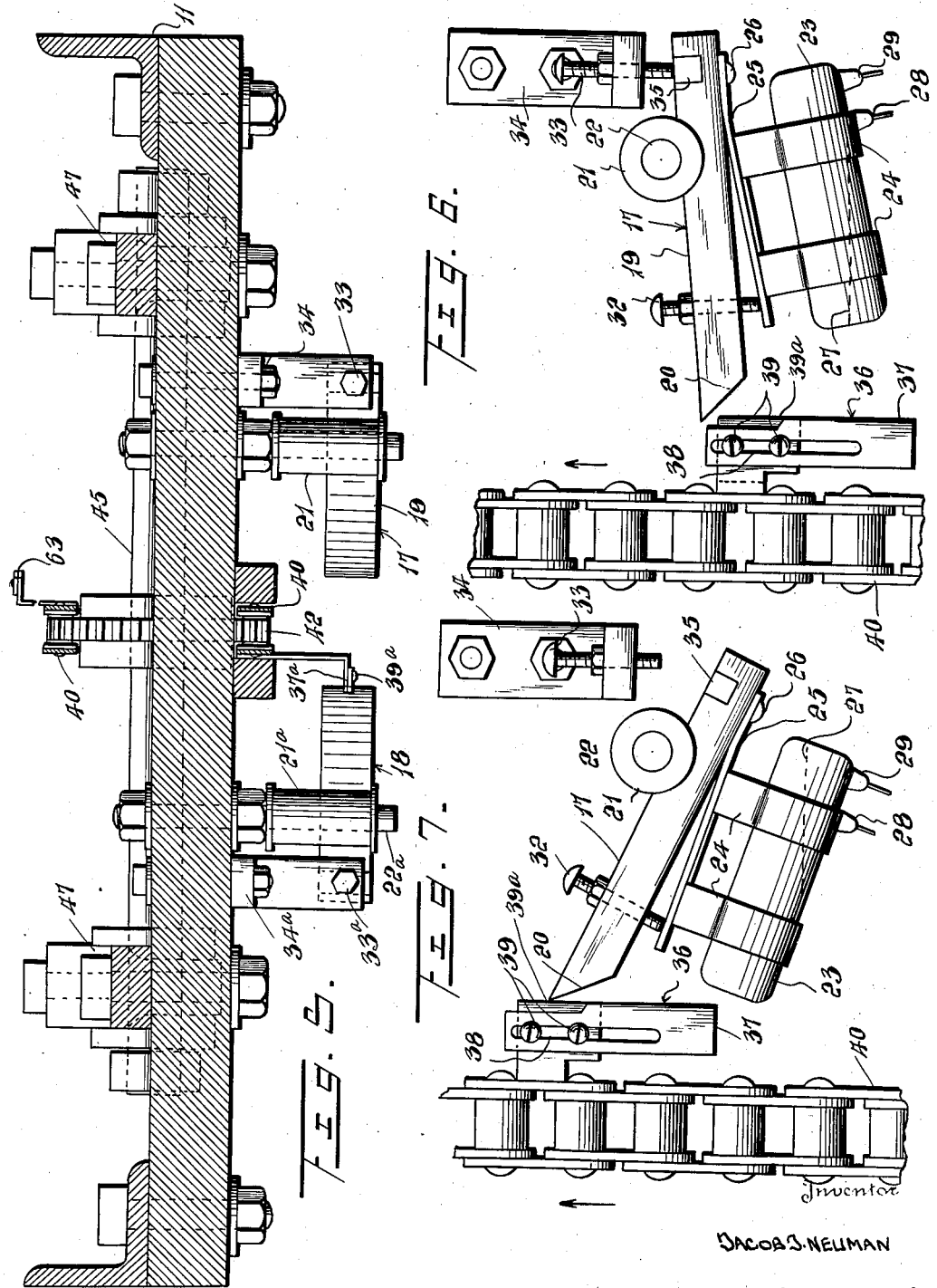

Nov. 25, 1941.    J. J. NEUMAN    2,264,247
AUTOMATIC CONTROL OF CENTRIFUGAL EXTRACTORS
Filed April 9, 1937    7 Sheets-Sheet 5
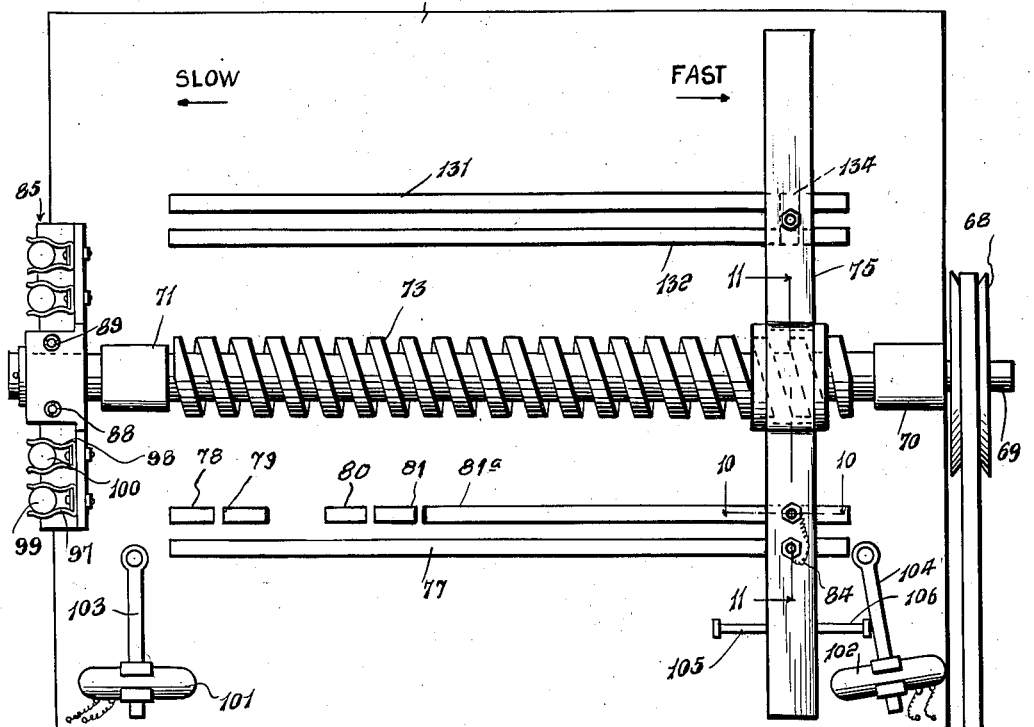
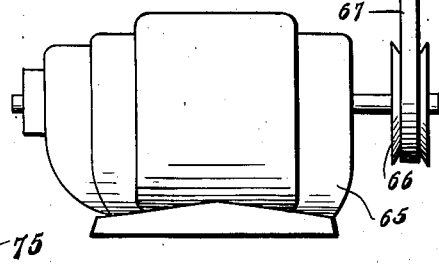
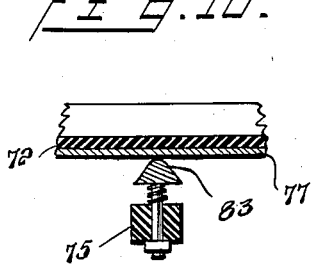
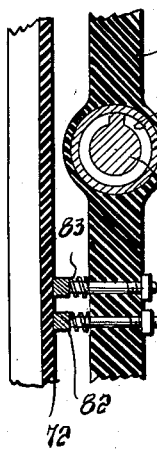
Inventor
JACOB J. NEUMAN
By C. P. Goepel
Attorney Nov. 25, 1941.  J. J. NEUMAN  2,264,247
AUTOMATIC CONTROL OF CENTRIFUGAL EXTRACTORS
Filed April 9, 1937  7 Sheets-Sheet 6

Inventor
JACOB J. NEUMAN

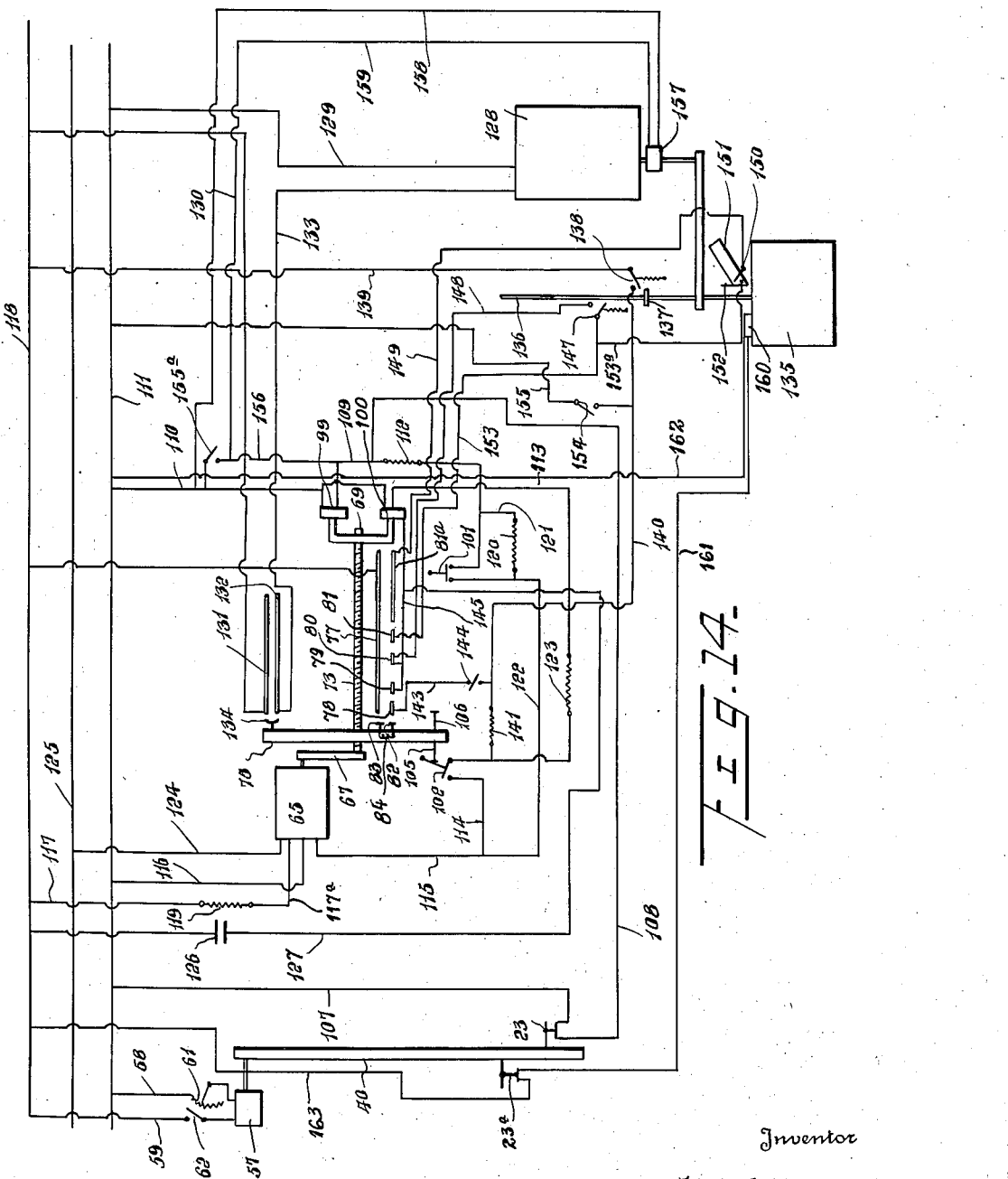

Patented Nov. 25, 1941

2,264,247

UNITED STATES PATENT OFFICE 2,264,247

AUTOMATIC CONTROL OF CENTRIFUGAL EXTRACTORS

Jacob J. Neuman, Jamaica, N. Y., assignor to United States Patent Development and Royalty Company, South Salem, N. Y., a company of New York Application April 9, 1937, Serial No. 135,879

11 Claims. (Cl. 210—72)

This invention relates to centrifugal extractor machines and more particularly to a sequence control for the cycles of the machines.

An object of this invention is to provide an automatic control means for the cycles of extractor machines so that a series of extractor machines will operate in sequence and thereby discharge into a conveyor in such a manner as not to crowd the conveyor.

At the present time it is the practice to provide control means for the discharge of the extractor machines, but where a series of such machines discharge into a common conveyor the individual control means cannot be accurately timed so that no two machines will discharge at the same time. The individual control means for the machines results in the acceleration of several machines at once which places an undue load on the power lines for the motors. It is, therefore, another object of this invention to provide a control means for use with any number of extractor machines which are arranged for discharge into a common conveyor which will maintain an even load on the power lines through the progressive acceleration of the motors.

A further object of this invention is to provide a control means of this character which will permit the ready inspection of the extractor machines at any time during each cycle so that the operator may inspect one machine and then progress to the next one whereas when the sequence control is not used the operator never knows which machine will discharge next.

A still further object of this machine is to provide a control means which is capable of various adjustments so that the cycle of each machine may be lengthened or shortened dependent upon the character of the material.

Still another object of this invention is the provision of a control means for the cycle of operation of the extractor motor so that where a sugar with heavy or sticky molasses or a small grain sugar is being run through the extractor and requires a longer spinning time the increase in the length of the cycle will also control the quantity of water and the time before the wash water is applied.

This control of the extractor may be expressed as follows:

$T_1$ = the time of cycle
$T_2$ = the time elapsed before the water is applied
$T_3$ = the amount of water
$S$ = the speed of the motor then $T_1 \propto S$
$T_2 \propto S$
$T_3 \propto S$ With the foregoing and other objects in view, the invention will be more fully described hereinafter, and will be more particularly pointed out in the claims appended hereto.

In the drawings, wherein like symbols refer to like or corresponding parts throughout the several views, Figure 1 is a detail side elevation, partly broken away, of a centrifugal extractor control means constructed according to an embodiment of this invention.

Figure 3 is an enlarged fragmentary side elevation of the control means.

Figure 4 is a detail front elevation, partly broken away, of the control means.

Figure 5 is a sectional view taken on the line 5—5 of Figure 4.

Figure 6 is a fragmentary front elevation of one of the switch members in opened position and about to be engaged by the switch operating member.

Figure 7 is view similar to Figure 6 but showing the switch member in closed position.

Figure 8 is a sectional view taken on the line 8—8 of Figure 4.

Figure 9 is a detail front elevation of the pilot motor and the control panel therefor.

Figure 10 is an enlarged sectional view taken on the line 10—10 of Figure 9.

Figure 11 is an enlarged sectional view taken on the line 11—11 of Figure 9.

Figure 14 is a diagrammatic view of the entire system.

Figures 1, 2:
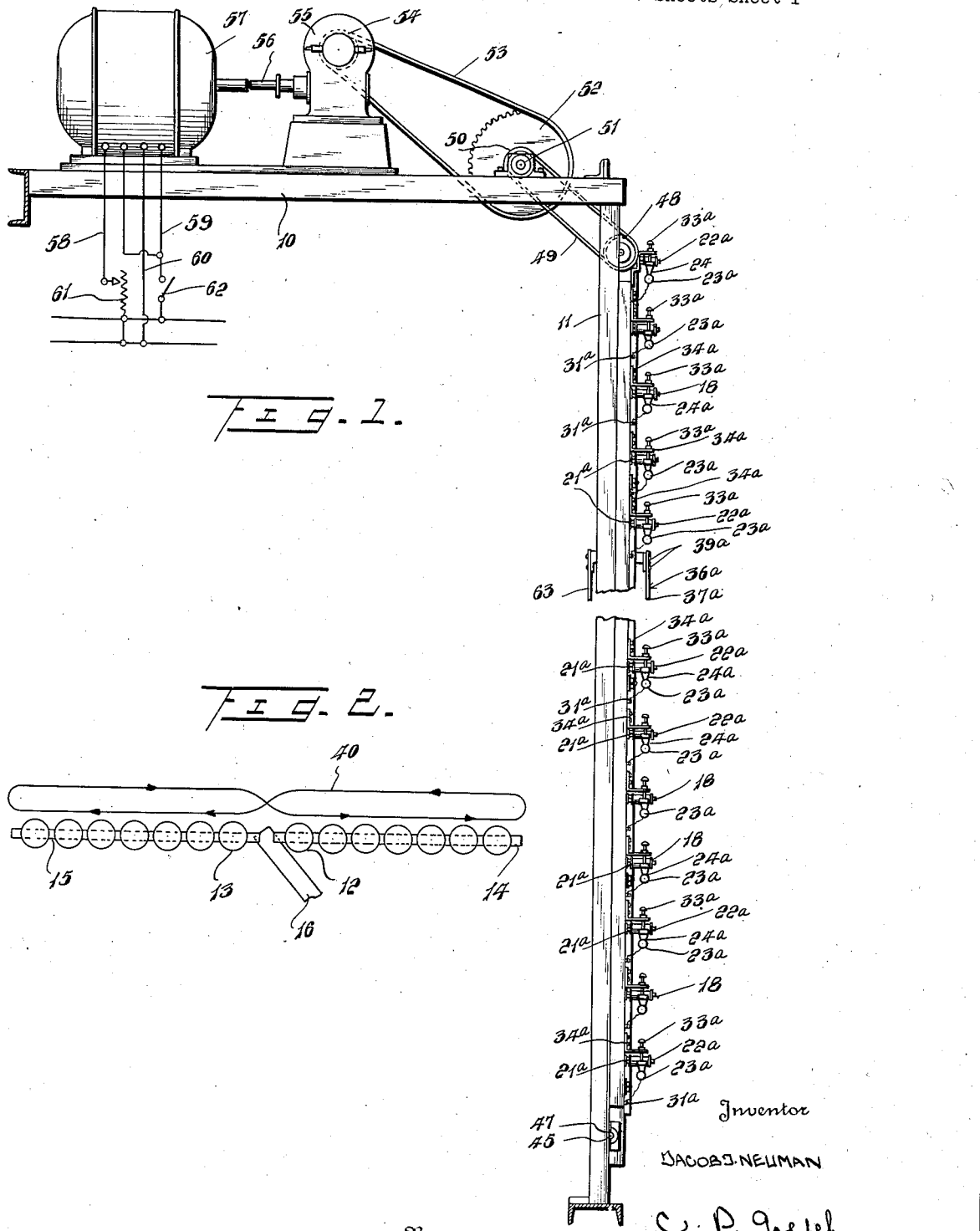
Figure 2 is a diagrammatic view showing the manner in which the extractor machines are operated in sequence by means of this invention.
Figure 12:
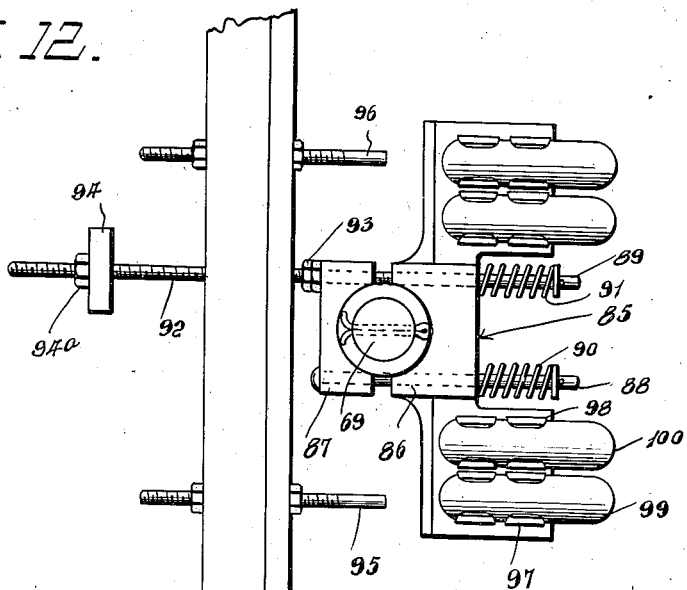
Figure 12 is a fragmentary end elevation of one end of the control panel.

Referring to the drawings, the numeral 10 designates a horizontally disposed frame which in the present instance is disposed in an elevated position and which is secured to the upper end of a vertically disposed frame 11. It is the general practice in the use and operation of centrifugal extractor machines to provide a number of these machines which discharge their product into one or more conveyors which convey the material to a collector which then carries the material to the desired point for distribution or other disposal. During the operation of the extractor machine, it is the practice to use a solvent in the form of water which is fed to the machine during each cycle until the material is in such a condition that it may be discharged from the extractor machine. The provision of individual timing mechanisms for each machine are costly and in addition such mechanism cannot be regulated to the point where a satisfactory discharge of a series of machines can be effected without crowding or clogging of the conveyor and the consequent shutting down of certain machines and slowing up of other machines.

In Figure 2, there is shown a series of centrifugal machines 12 and a second series of centrifugal machines 13 which are disposed in alinement and which discharge into conveyors 14 and 15, respectively. The conveyors 14 and 15 are in alinement and move toward each other and discharge their product onto a chute or third conveyor 16 which then moves the material to the desired point for additional treatment or other disposition. Any number of centrifugal machines 12 and 13 may be disposed in each series, there being shown seven such machines in the two series by way of illustration.

The motors which run the various machines 12 and 13 are under the control of a mechanism similar to the mechanism set forth in my co-pending application Serial No. 45,524, filed October 10, 1935, the motor control mechanism being operated by pilot motors, and there being one pilot motor for each centrifugal machine. The operation of these pilot motors controls the cycle of each machine, and it is in order to provide a mechanism to control the operation of these pilot motors that the hereinafter described device has been constructed.

The vertical supporting frame 11 is provided with a plurality of vertically spaced apart switch supporting members 17 which are disposed in vertical alinement and a second series of vertically spaced apart switch supporting members 18 are secured to the frame 11 substantially opposite the supporting members 17.

Figure 13:
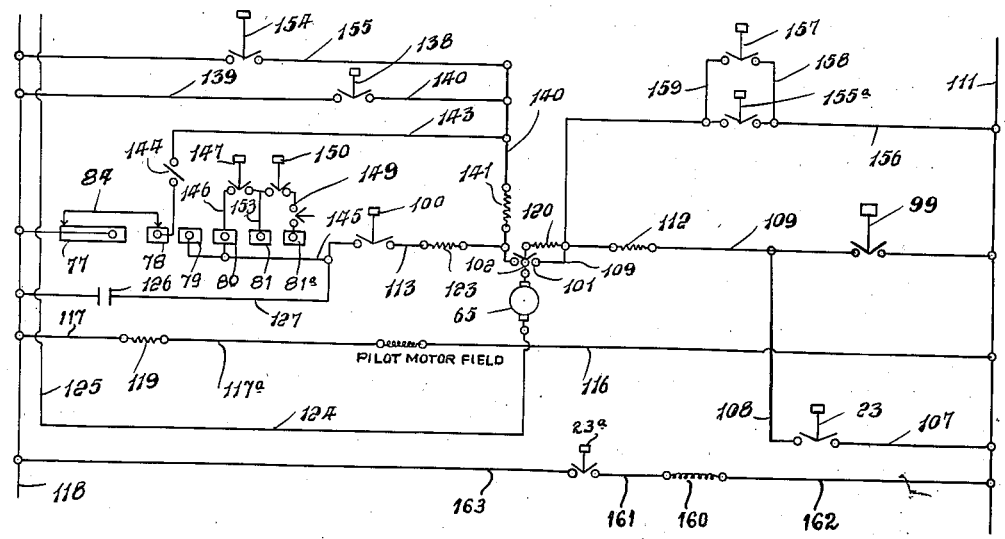
Figure 13 is a diagrammatic view of the electric circuits incorporated in this control system.

The supporting members 17 comprise an arm 19 which is provided with a tapered inner end 20 and which has a boss 21 outwardly of the longitudinal center thereof engaging a trunnion 22 which is fixedly secured to the frame 11. A liquid switch member 23 is removably mounted in clips 24 secured to a yieldable supporting strap or bar 25 which is secured at one end, as by a bolt 26 to the under side of the arm 19. The switch member 23 is adapted to have a quantity of mercury disposed therein, and is provided with a pair of spaced apart contacts 28 and 29 which are adapted to be engaged by the mercury when the arm 19 is in raised position. The contacts 28 and 29 are adapted to be connected by relatively flexible conductors to terminals 30 and 31 carried by the frame 11, which terminals 30 and 31 are in turn adapted to be connected to the circuits of the pilot motors as shown in Figs. 13 and 14.

The inner or free end of the resilient strap 25 is adjusted relative to the arm 19 by means of an adjusting bolt 32 which is threaded through the arm 19 adjacent the inner end thereof and which engages the strap 25 so as to hold the switch 23 in the desired angular position with respect to the arm 19 and thus form one means for regulating the time during which the switch 23 is closed through engagement of the globule 27 with the contacts 28 and 29. An adjusting screw 33 is threaded through an L-shaped bracket 34 which is fastened to the frame 11, and the lower end of this screw 33 is adapted to engage the outer or short end of the rock arm 19 so as to limit the downward swinging movement of this arm to a circuit breaking position. Preferably a non-conducting block or insulating member 35 is carried by the outer or short end of the arm 19, and this member 35 may also serve as a cushioning means for the outer end of the arm 19. The interval of time between two successive closings of one of the switches 23 determines the duration of time of one complete cycle of the particular machine with which the pilot motor circuit of this switch 23 is associated.

Water controlling switch members 23a are disposed in opposed relation to the switch members 23, being mounted in clips 24 which are secured to supporting members 18. The supporting members 18 comprise a rock arm 19a provided with a boss 21a which engages a trunnion 22a. The short arm of the rock member 19a is provided with a block 35a engaged by an adjusting bolt 33a which is threaded into a bracket 34a fastened to the vertical supporting frame 11. The switch member 23a has conductors 28a and 29a secured thereto in spaced relation similar to the conductors 28 and 29 of the switch member 23, and these conductors 28a and 29a are connected to terminals 30a and 31a.

The switches 23 are rocked to a circuit closing position by means of a striker or tripping member 36. This tripping member or striker 36 comprises an elongated bar 37 provided with an elongated slot 38, and an adjusting bolt 39 engages through the slot 38 and adjustably secures the bar 37 to the bracket 39a which is secured in outstanding position to one side of a flexible member 40 in the form of an endless chain or the like. The chain 40 is trained over upper and lower sprockets 41 and 42, respectively, which are mounted on shafts 44 and 45, respectively. The shaft 44 is journalled in bearings 46 carried by the upper portion of the frame 11, and the shaft 45 is journalled in bearings 47 carried by the lower portion of the frame 11.

A sprocket or pulley 48 is secured to the shaft 44 and has a flexible member 49 trained thereover, the flexible member 49 being also trained over a second sprocket or pulley 50 mounted on a countershaft. The countershaft 51 carrying the countersprocket 50 has a relatively large sprocket 52 secured thereto, and a flexible member 53 engages over this sprocket 52. A sprocket 54 engages the flexible member 53, and this sprocket 54 is secured to a reduction gearing 55 of conventional construction. The reduction gearing 55 is operated by means of a shaft 56 which is connected to a motor or power member 57. The motor 57 is connected to a suitable source of electric current supply by means of conductors 58, 59, 60. Preferably, the amount of current supplied the motor 57 is controlled through the medium of a rheostat 61 which is interposed in the conductor 58. A switch 62 may be interposed in the conductor 59 so as to cut off the current supply when desired. While the reduction gearing 55 and the reducing sprockets connecting this gearing with the shaft 44 will reduce the speed of operation of this shaft, the speed of the shaft 44 may be further reduced through the operation of the resistance or rheostat 61 so that any desired timing may be effected for the switches 23.

The switches 23a may be tripped by means of a tripping member 63 which is secured to the chain 40 on the side thereof opposite from the tripping member 36. This tripping member 63 may be secured to the opposite side of the tripping member 36 in a position so that when the tripping member 36 is on the front run of the chain 40 the tripping member 63 is on the rear run of the chain. The spacing between these tripping members 36 and 63 may be varied at will, and if desired additional tripping members of the same type may be secured to the chain 40 so as to in this manner effect a more rapid tripping of the switches 23 and 23a.

The front run of the chain 40 moves upwardly, and the lowermost switch 23 is secured to the pilot motor controlling the centrifugal machine closest to the chute or conveyor 16 in the series 12 of these machines, and in like manner the lowermost switch 23a is connected to the water controlling circuit of the same centrifugal machine in the series 12. The succeeding switches 23 are connected to the succeeding centrifugal machines in the series 12 from the innermost machine to the outermost machine, so that the cycle of each centrifugal machine is set in operation in sequence beginning with the innermost machine. In this manner, the innermost machine will complete its cycle and discharge its load onto the conveyor 14, and the remaining machines will follow in sequence until the last machine in the series has completed its cycle and discharged its load. The tripping member 36 now continues up the panel 11 tripping the switches 23 associated with the series of machines 13, starting likewise with the innermost machine and continuing until the machines in the series 13 have all completed their cycle and discharged into the conveyor 15. In the meantime, the tripping member 63 has been tripping the switches 23a, thus turning on the water for each of the machines at the proper time as determined by its position relative to the tripping member 36.

In order to provide a means whereby the number of cycles may be registered or counted, I have provided a counting device 64 which is operatively engaged with one of the supporting members 17, and is moved forward one division each time this one supporting member 17 is tripped by the tripping member 36.

In Figures 9 to 12 inclusive, there is disclosed a pilot motor and control means for the extractor motor which comprises a motor 65 which is adapted to be connected to a source of current supply as will be hereinafter described, and this motor 65 has a drive pulley 66 over which a belt 67 engages. The belt 67 engages a driven pulley 68 secured to a shaft 69 which is journalled in bearings 70 and 71 carried by a panel or base 72. The shaft 69 is provided intermediate the bearings 70 and 71 with a threaded portion 73 which is engaged by a nut 74 carried by a carriage or bridge 75. The base or panel 72 is provided with an elongated contact strip 77 and a second contact strip 81a which is relatively shorter in length than the strip 77 and is parallel thereto. The base 72 is also provided with longitudinally spaced apart contacts 78, 79, 80, and 81 which are in alinement with the contact strip 81a. These short contact members 78 to 81a inclusive, are adapted to be connected in electric circuits as will be hereinafter described. The bar or bridging member 75 is provided with a wiper 82 engaging the contact strip 77, and is also provided with a second wiper 83 engaging the contact strips 78 to 81a inclusive. The two wipers 82 and 83 are connected together by a connector 84.

A frictional switch operating member, generally designated as 85, engages the shaft 69 at the end opposite from the pulley 68 and comprises a pair of blocks 86 and 87 which are provided with opposed substantially semi-circular recesses to engage about the smooth surface of the shaft 69, and these blocks 86 and 87 are frictionally held about the shaft 69 by means of a pair of bolts 88 and 89 which are tensioned by means of springs 90 and 91, respectively. The bolt 89 is provided with an elongated extension 92 which is threaded, and lock nuts 93 are threaded on to the threaded portion 92 and engage against the inner block 87. A weight or balancing member 94 is threaded onto the extension 92 and is adapted to be adjusted therealong to maintain the assembly 85 in the desired operative or inoperative position. A lock nut 94a may engage against the weight 94 so as to lock the weight 94 in adjusted position along the length of the threaded extension 92. A pair of stop members 95 and 96 are carried by the base 72, one on each side of the shaft 69 and are adapted to be adjusted relative to the adjacent end of the friction clamp member 86 so as to limit the rocking movement of this member upon rotation of the shaft 69. The friction clamping member 85 is provided with a plurality of clips 97 and 98 in which are detachably secured liquid switch members 99 and 100 respectively.

A pair of carriage limit switches 101 and 102 are swingably secured, as by a pivoted arm 103 and 104, respectively, to the panel 72, and disposed in a position for engagement with outstanding arms 105 and 106, respectively, secured to the carriage 75. These switch members 101 and 102 are interposed in electric circuits as will be hereinafter described.

In Figure 14 there are disclosed complete electric circuits for the automatic control means hereinbefore described. The switch member 23 has one side thereof connected as by a wire 107 to the negative side of a source of current supply, and the other side of the switch 23 is connected as by a wire 108 to a wire 109 which is connected to one side of the switch member 99. The other side of the switch 99 is connected as by a wire 110 to the negative line 111. The wire 109 connects the switch member 99 with one side of the limit switch 101, and a resistance element 112 is interposed in the wire 109 for the purpose of changing the potential of the current to the pilot motor 65.

The switch member 102 is connected at one side to a wire 113, and the other side of the limit switch 102 is connected as by a wire 114 to a wire 115 which is connected to the pilot motor 65. Preferably, the wire 115 is connected to the armature of the motor 65. The field coil of the motor is connected as by a wire 116 to the negative line 111, and is connected as by a wire 117 to the positive line 118. A resistance 119 is preferably interposed in the wire 117, wire 117a connecting the resistance 119 with the motor 65. A resistance 120 is interposed in a shunt wire 121 which is connected across the wire 109 and a wire 122, which is connected to the opposite side of the limit switch 101. This wire 122 is connected to the wire 115 and the resistance 120 coacts with the resistance 112 in producing the proper resistance to reverse the potentials to the armature of the motor 65. The wire 113 connecting one side of the limit switch 102 with wire 145 has a resistance 123 interposed therein. The other side of the motor armature is connected as by a wire 124 to a neutral line 125. In order to prevent undue arcing between the contact members 77 to 81 inclusive, when the wiper moves thereover a condenser 126 is interposed in a wire 127 connecting the positive line 118 with the switch 100.

The hereinbefore described control means are adapted to be connected to the electric motor for the extractor and associated directly with the extractor as embodied in my co-pending applications 45,524 and 46,069. The extractor motor 128 is connected as by a wire 129 to the negative side 111 of the current supply, and a wire 130 connects the positive line 118 to a resistance strip 131 which is secured to the panel 72 on the side of the shaft 69 opposite from the contact strips 77 and 81a. A second resistance strip 132 is secured to the panel 72 in parallel relation with the resistance 131 and this strip 132 is connected as by a wire 133 to the other side of the motor 128. A bridging member 134 is secured to the carriage 75 and engages the two resistance strips 132 and 133 so as to control the speed of the extractor motor 128 by movement of the carriage 75.

The extractor 135 has a plow shaft 136 which is movable vertically as described in the aforementioned pending applications and the plow shaft 136 is provided with an arm 137 which is adapted to engage a switch member 138 which is biased to an open position so as to close this switch 138 when the plow shaft 136 rises vertically from the bottom of the extractor 135 for a short distance. The switch 138 has one side thereof connected by a wire 139 to the positive line 118 and the other side of the switch 138 is connected by a wire 140 to the wire 113 between the resistance 123 and the limit switch 102. A resistance 141 is interposed in this wire 140. A wire 143 is connected to the contact 78 and to the wire 146 between the resistance 141 and the switch 138. A switch 144 is interposed in this wire 143. The contact member 79 is connected by a wire 145 which is connected to the friction switch 100. A wire 153 is connected at one end to the contact 81 and at the opposite end to a switch 147 which is positioned for engagement with the arm 137 carried by the plow shaft 136 after the plow shaft 136 has been raised to the limit of its upward movement. This switch 147 is biased to an open position so that when the shaft 136 is moved downwardly, the switch 147 will be moved to an open position. The opposite side of the switch 147 is connected by a wire 148 to the contact 80.

A contact 81a is secured to the panel 72 in alinement with the contacts 78 to 81 inclusive, and this contact 81a is connected by a wire 149 to one side of a switch 150 which is secured to the discharge nozzle 151 in a position for engagement with the gate or closure 152 when this gate 152 is moved to a closed position. The opposite side of the switch 150 is connected by a wire 153a to the wire 153.

In order to provide a means whereby the operation of the pilot motor 65 may be manually changed at will, I have provided a manually operable switch 154 which is interposed in a wire 155 connected at one end to the wire 139 and at the other end to the wire 140. A second manually operable switch 155a is interposed in a wire 156 which is connected at one end to the wire 110 and at the other end to the wire 109. In the event the extractor motor 128 attains an excess speed the pilot motor is reversed by means of an overspeed switch 157 which is operatively connected to the motor 128 and is normally open. The switch 157 is connected by a wire 158 to the wire 110 and is connected by a wire 159 to the wire 156. In this manner, when the extractor motor 128 attains an excess speed the switch 157 will close, thereby placing the resistance 120 in the circuit of the motor 65 and reversing the potential so that the motor 65 will thereby reverse and move to the slow speed end of the resistance members 131 and 132.

A solenoid operated water controlling means 160 is carried by the extractor 135 and is connected to one side of a switch 23a by means of a wire 161, and to the power line 111 by means of a wire 162. Wire 163 connects the other side of switch 23a to power line 118.

In the operation of this control device, the switch 144 is manually closed and the motor 57 is set in operation by closing the switch 62. The speed of the motor 57 is regulated in accordance with the character of the material being run through the extractor 135 and when the motor 57 rotates the chain 40 is moved so as to close the switches 23 and 23a in progression.

The closing of the switch 23 will bridge the switch 99 so as to start the motor 65, assuming that the carriage 75 is at the right hand end of the panel 72 as viewed in Figure 9. The switch 101 will be in closed position and the switch 102 in open position, so that when the switch 23 is closed the motor 65 will be started in a direction to move the carriage 75 across the panel 72 from right to left. As soon as the screw 69 starts to rotate, this causes the friction assembly 85 to swing so as to close the switch 99 and open the switch 100. The carriage 75 continues to move toward the left. As soon as the carriage 75 has moved to the left a short distance, the outstanding arm 106 allows the pivoted arm 104 to swing to a vertical position by gravity, thus closing the switch 102. This, however, has no immediate effect as the switch 100 is now open. By this time, the chain 40 has moved sufficiently so that the switch 23 has dropped back to its normal position and is open. However, the motor 65 does not stop as the switch 99 is now closed and it is no longer necessary to bridge it to energize the motor 65, so the carriage 75 continues to move to the left. At the same time, the wiper 134 moves along the resistance strips 131 and 132, thereby gradually increasing the resistance and slowing down the extractor motor 128. The wipers 82 and 83 are also moving to the left and, referring to Fig. 14 the wiper 82 is in continuous contact with the segment 77 and the wiper 83 successively passes over the contacts 81a, 81, 80 and 79 in the order named. This, however, has no effect at this time, as the friction switch 100 is in open position.

However, when the wiper 83 comes in contact with the contact strip 78, referring to Fig. 13, a circuit is completed from the positive line 118 to the contact strip 77 and thence through the wiper 82, the wire 84, the wiper 83, the contact strip 78, the wires 143 and 140, the resistance 141, and the switch 102 to the motor 65. In the meantime, the outstanding finger 105 has tilted the switch 101 to open position, thus removing the shunt 109 around the resistor 120. This results in a higher potential being delivered to the motor 65 from the positive line 118 than from the negative line 111, which reverses the motor 65, causing it to turn in a direction so as to move the carriage 75 to the right as viewed in Fig. 9.

As the direction of rotation of the shaft 69 changes, the friction assembly 85 tilts so as to close the switch 100 and open the switch 99. The carriage 75 continues to move to the right until the wiper 83 engages in the space between the contact members 80 and 79. This space is sufficiently large so that the wiper 83 will not contact with the contact members 80 and 79 at the same time, thus breaking the circuit to the motor 65 and causing the motor 65 to stop.

When the motor 65 is stopped with the carriage 75 at this position, the wiper 134 is at such a position on the resistance strips 131 and 132 that the extractor motor 128 is operated at a slow speed suitable for plowing out or discharging the extractor 135. The plow shaft 136 is now lowered as described in the aforementioned copending applications, and when the extractor 135 is empty, it is gradually raised and as the arm 137 contacts with the switch 138, it closes it for a short period, thus starting up the motor 65 and effecting a movement of the carriage 75 to the right, as viewed in Fig. 9. The wiper 83 is thus moved across the contact strip 80 and onto the contact strip 81 and stops due to the fact that since the plow shaft 136 has not raised sufficiently the switch 147 is still open. The plow shaft 136 continues to rise until the arm 137 contacts with the switch 147, which closes it and again starts up the motor 65 and causes movement of the carriage 75 to the right, speeding up the extractor motor 128 to a speed suitable for walling up the sugar or other fill mass on the sides of the extractor basket 135. At this time the charging gate 152 is adapted to open, thus opening the switch 150, and as the wiper 83 contacts the strip 81a, the motor 65 stops due to the open circuit through the switch 150.

After the extractor is charged, the gate 152 is adapted to close, as described in the aforementioned copending applications, thus closing the switch 150 and starting the motor 65 in a direction to effect movement of the carriage 75 to the right as viewed in Fig. 9. The wipers 82 and 83 now move along the strips 81a and 77 without further interruption until they arrive at the extreme right hand end of the panel 72 when the outstanding arm 106 tilts the switch 102 to open position, thus opening the circuit to the motor 65, stopping it and the carriage 75. Meanwhile, the wiper 134 has been moving along the resistance strips 131 and 132, and is now at the right hand end as viewed in Fig. 9, thus reducing the resistance to zero and accelerating the extractor motor 128 to high speed. When the extractor 135 has revolved at high speed for a sufficient interval of time, the water is turned on in the extractor basket 135. This is set by the position on the chain 40 of the adjustable tripping member 63 and the speed of the chain 40, as determined by the speed of the motor 57 and controlled by the setting of the rheostat 61.

The adjustable tripping member 63 closes the switch 23a, and maintains it in closed position for a duration of time equal to the time that it takes the bar 37 to slide along the tapered inner end 20a of the switch supporting member 17a. The member 17a then drops to its normal position, opening the switch 23a and shutting off the water.

The extractor motor 128 continues on high speed for another interval of time until the tripping member which trips the switches 23 again closes the switch 23 energizing the pilot motor 65, thereby effecting movement of the carriage 75 to the left and the cycle of events repeats itself in the same manner.

Assuming that all the sugar has been discharged from the extractor 135, the plow shaft 136 starts to rise and when it has progressed a short distance the switch 138 is closed momentarily. It will be remembered that prior to the closing of the switch 138, as described in the paragraph beginning line 16, column 1 of this page, the pilot motor 65 has been at rest during plowing due to the wiper 83 being in the non-conductive space between the contact members 79 and 80. The closing of switch 138 has several effects.

The first effect of closing the switch 138 is to by-pass the break in the circuit at the wiper 83. The pilot motor 65 thus starts moving the carriage 75 and the wiper 83 to the right and off of said non-conductive space onto the contact member 80. This causes the circuit to the motor 65 to be maintained through wire 145, closed switch 100, wire 113, resistance 123, etc. (best seen in Fig. 13). The pilot motor 65 thus continues to operate even after switch 138 opens again and the carriage 75 and wiper 83 move across contact member 80 and onto contact member 81. The pilot motor 65 now stops due to the fact that switch 147 is open, interrupting the circuit to said contact member 81. However, in moving the carriage 75 this distance to the right the extractor motor 128 has been accelerated almost to charging speed. It will be appreciated that saving of time is an important consideration and this is the main purpose of this feature.

During the time elapsed while the above described events were taking place, the plow shaft 136 has continued to rise out of the extractor 135 and when the wiper 83 stops on contact member 81 is normally almost out of the extractor. However, in a full automatic machine, with an attendant only occasionally present, if something goes wrong the plow shaft 136 might stop part way out of the extractor 135. It would then be undesirable for two reasons to have the extractor accelerate all the way to charging speed, which compared to plowing speed is rather high. First, the plow at this higher speed might dig into the screen of the basket and damage both it and the plow. Secondly, if the extractor reached charging speed the gate 152 would open and magma would enter the basket and be immediately plowed out again in an unprocessed condition. This might continue for some time until noticed by an attendant, thus spoiling all the previously processed sugar. Thus, while it is desirable, for the purpose of saving time, to complete as far as possible the acceleration of the extractor 135 to charging speed, it is undesirable to have charging actually take place until the plow shaft 136 is all the way out of the extractor 135. Therefore, the switch 147 is so positioned that the member 137 of the plow shaft 136 does not close it until the plow is safely out of the basket.

The pilot motor 65 then starts and accelerates the extractor the small remaining amount necessary to reach charging speed and charging is initiated almost immediately. The function of the switch 150 is to again arrest the pilot motor 65 and consequently further acceleration of the extractor until charging is completed and the gate 152 closes, thereby again putting switch 150 in closed circuit position. The extractor 135 is thus maintained at a uniform speed of rotation suitable for charging until charging is entirely completed when it is permitted to accelerate up to high or extracting speed.

It will be appreciated that if no acceleration of the extractor, above plowing speed, was allowed until the plow was entirely out of the extractor, that considerable time would be consumed which is all saved by the method of operation above described.

It is obvious that various changes and modifications may be made in the details of construction and design of the above specifically described embodiment of this invention without departing from the spirit thereof, such changes and modifications being restricted only by the scope of the following claims.

What is claimed is:

1. In combination, an extractor, an electric motor for operating said extractor, a plow mechanism for discharging said extractor, said plow mechanism being movable to an operative position within said extractor to discharge the same, to an initial inoperative position, and to a final inoperative position, control means electrically connected to said electric motor for varying the speed of said motor, means for operating said control means, means for initiating operation of said operating means for said control means to shift said control means to low speed position of said extractor operating motor, means for stopping said control means when said control means is in the low speed position of said extractor operating motor, means operatively associated with said plow mechanism to initiate operation of said operating means for said control means toward high speed position of said extractor operating motor when said plow mechanism is moved to initial inoperative position, means for stopping said operating means for said control means a predetermined time after said last mentioned initiation of said operating means, and means operatively associated with said plow mechanism for resuming operation of said operating means for said control means toward high speed position of said extractor operating motor when said plow mechanism reaches said final inoperative position.

2. In combination, an extractor, an electric motor for operating said extractor, a circuit for said motor, a plow mechanism for discharging said extractor, said plow mechanism being movable to an operative position within said extractor to discharge the same and to an inoperative position, control means for said electric extractor operating motor comprising a resistance means and control means for cutting said resistance means into and out of said circuit, means for operating the control means, means for initiating operation of said control means operating means to cut said resistance means into the circuit, means for stopping said control means operating means when a substantial amount of resistance has been cut into said circuit, means operatively associated with said plow mechanism for initiating operation of said control means operating means to cut said resistance out of said circuit when said plow mechanism reaches inoperative position.

3. In combination, an extractor, an electric motor for operating said extractor, a plow mechanism for discharging said extractor, said plow mechanism being movable to an operative position within said extractor to discharge the same, to an initial operative position, and to a final inoperative position, a circuit for said motor, control means comprising a variable resistance, a movable member associated with said resistance for cutting in and out increasing and decreasing amounts of said resistance in the motor circuit, means for operating said movable member, means for initiating operation of said movable member operating means to cause said movable member to cut increasing amounts of resistance into said circuit, means associated with said movable member for stopping operation of said operating means when a substantial amount of resistance has been cut into said circuit causing a uniform relatively slow speed of operation of said motor and extractor, means operatively associated with said plow mechanism to initiate operation of said operating means to cause said movable member to progressively decrease the amount of resistance in said circuit when said plow mechanism reaches said initial inoperative position, means for stopping said operating means after a predetermined amount of such resistance has been cut out of said circuit, and means operatively associated with said plow mechanism for resuming operation of said operating means to cause said movable member to further decrease the amount of resistance in said circuit when said plow mechanism reaches said final inoperative position.

4. In combination, an extractor, an electric extractor motor for operating said extractor, a circuit for said motor, a variable resistance and a movable member operatively associated with each other and connected in the circuit to vary the resistance therein by movement of said movable member in opposite directions, a reversible driving shaft connected to drive said movable means in opposite directions to increase and decrease the resistance in said circuit respectively, a reversible electric actuating means connected to said shaft to drive the same in opposite directions, initial and continuing circuits for said actuating means, trip means for periodically closing said initial circuit, and normally open switch means in said continuing circuit carried frictionally by said shaft and tiltable on initial rotation of said shaft to close said switch means.

5. In combination, an extractor, an electric extractor motor, a circuit for said motor, control means electrically connected to said motor to vary the speed of said motor comprising resistance in said circuit, a member movable back and forth over said resistance to increase and decrease the resistance in said circuit respectively, from an initial position of low resistance, reversible actuating means for said member, trip means to initially start said actuating means in a direction to increase the resistance in said circuit, continuing means for continuing the operation of said actuating means, means operatively associated with said movable member and said continuing means and said actuating means for discontinuing said continuing means and reversing the direction of movement of said actuating means, means associated with said movable member and with said actuating means to cause stoppage of said actuating means shortly after reversal of said actuating means when the movable member is in such a position that a substantial amount of resistance is included in said circuit to secure a relatively slow speed of operation of said motor for discharge of the extractor, a plow mechanism for the extractor, said plow mechanism being movable to an operative position within the extractor to discharge the same, to an initial inoperative position, and to a final inoperative position, means operatively associated with said plow mechanism and said actuating means for causing resumption of said actuating means to decrease the resistance in said circuit when the plow mechanism reaches the initial inoperative position, means for stopping said actuating means a predetermined time after said resumption, means operatively associated with said plow mechanism and said actuating means for again renewing operation of said actuating means to further decrease the resistance in said circuit when the plow mechanism reaches the final inoperative position, a source of material to be centrifuged communicating with said extractor, a movable charging gate for controlling the passage of material from said source to said extractor, means associated with said gate and with said actuating means for causing stoppage of said actuating means in such position that a relatively low amount of resistance is included in said circuit when said gate is in open position to secure uniform operation of said extractor at accelerated speed, means associated with said gate and with said actuating means to start said actuating means in such direction to move the movable member to said initial position of low resistance, and means associated with said movable member and said actuating means for stopping said actuating means when the movable member reaches said initial position of low resistance.

6. In combination, an extractor, an electric extractor motor for operating said extractor, a circuit for said motor, a plow mechanism for discharging said extractor movable to an operative position within said extractor to discharge said extractor and to an inoperative position, a source of material to be extracted communicating with said extractor, a movable charging gate for controlling the passage of material from said source to said extractor, control means electrically connected with said motor for varying the speed of said motor, said control means comprising a circuit, resistance in said circuit, a movable member movable back and forth over said resistance to increase and decrease the amount of resistance in said circuit respectively, reversible actuating means for said member, normally closed swinging switches positioned in the path of said member at opposite limits of its travel to be alternately opened by said member, a circuit including said actuating means and one of said swinging switches, trip means for closing said actuating means circuit, a continuing circuit including said actuating means and the same swinging switch to cause said member to traverse its path of movement in one direction and to open said swinging switch when it reaches the end of said path, means for reversing the movement of said actuating means and member, means for continuing the operation of said actuating means and member, stoppage means for interrupting the action of said last named means to enable the extractor to be driven at uniform relatively slow speed of operation for discharge, means operatively associated with said actuating means and with said plow mechanism to cause resumption of movement of said actuating means in a direction to drive the member to decrease the amount of resistance in the circuit, and means operatively associated with said charging gate and with said actuating means to cause stoppage of said actuating means and said member when said charging gate is in open position.

7. In combination, an extractor, a motor for driving said extractor, movable control means for varying the speed of said motor, trip means for initiating movement of said control means to move the same toward low speed position of said extractor motor, said control means having cooperating parts for arresting the movement of said control means in a decelerated speed of the extractor motor suitable for discharge of said extractor, a movable plow member for the extractor movable to an operative position within the extractor to discharge the same and to an inoperative position, means operatively associated with said plow member and said control means to again put said control means in motion to accelerate said extractor motor when said plow is in inoperative position, means for arresting the movement of said control means at a relatively higher speed of said extractor and motor suitable for charging, and means for setting said control means in motion again in a direction to increase the speed of said motor and extractor to cause said motor and extractor to again resume extraction speed.

8. In combination, an extractor, a motor for driving said extractor, movable control means for varying the speed of said motor, trip means for initiating movement of said control means in a direction to decrease the speed of said motor, said control means having cooperating parts for arresting the movement of said control means in a decelerated speed of the extractor motor suitable for discharge, a movable plow member for the extractor movable to operative and inoperative positions, means operatively associated with said plow means and said control means to again put said control means in motion to accelerate said motor and extractor subsequent to discharge when said plow means is in inoperative position, means for maintaining said motor and extractor at a relatively high uniform speed suitable for charging, means for setting said control means in motion again subsequent to charging to cause the motor and extractor to resume extraction speed, wash means for delivering wash water to said extractor, governor means for the wash means having a trip part, and means operatively associated with said trip means for said control means, and said trip part for said wash means governor for causing actuation of the wash means in timed relationship to the act of initiating movement of said control means.

9. In combination, an extractor, an extractor motor connected to operate said extractor, a control means connected to said motor for varying the speed of said motor to a slow discharging speed, an intermediate charging speed, and a high extracting speed, means for charging said extractor, control means for said charging means, discharge means for discharging said extractor, control means for said discharging means, means for actuating said extractor motor control means to move the same to the slow speed position of said extractor motor, means associated with said discharging means and said extractor motor control means actuating means for causing said actuating means to move said extractor motor control means to said intermediate charging speed of said extractor motor when the discharging operation is completed, and means associated with said charging control means and with said actuating means to cause said actuating means to resume movement of said extractor motor, control means to high extracting speed position of said extractor motor when said charging operation is completed.

10. In combination, a plurality of centrifugals mounted in succession, each centrifugal having a discharge means, a conveyor common to all said centrifugals disposed to receive discharged material from said discharge means, control means for each centrifugal adapted to cause its respective centrifugal to execute its cycle of operations, a starting means for each of said control means, said starting means all being arranged at intervals throughout a common path, trip means and driving means for said trip means, said trip means being arranged for travel through said path to successively operate said starting means in succession and at fixed intervals of time for a given time of one extractor cycle, means operatively associated with the control means for each extractor for changing the total time of the cycle for an extractor while at the same time maintaining equal time intervals between successive operations of the cycle.

11. In combination, a battery of centrifugals, each of said centrifugals being provided with a discharge means, a conveyor common to said centrifugals and positioned to receive material discharged from said discharge means, constant speed control means for each of said centrifugals to cause it to execute its cycle of operation, starting means for each of said control means, said starting means being arranged at intervals throughout a common path, a trip means and driving means for said trip means, said trip means being arranged for travel through said path to operate said starting means in sequence, and means for varying the rate of movement of the driving means for the trip means to enlarge or diminish the interval of time of operation for each of said extractors before its control means is tripped for requiring each centrifugal to perform its cycle at equally spaced intervals of time and in successive pace with respect to each other.

JACOB J. NEUMAN.